United States Patent
Lopez et al.

(10) Patent No.: US 11,041,258 B2
(45) Date of Patent: *Jun. 22, 2021

(54) ARTIFICIAL TURFS AND METHOD OF MAKING THE SAME

(71) Applicant: Dow Global Technologies LLC, Midland, MI (US)

(72) Inventors: David Lopez, Tarragona (ES); Cornelis F. J. Den Doelder, Terneuzen (NL); Jesus Nieto, Tarragona (ES); Barbara Bonavoglia, Horgen (CH); Frederik E. Gemoets, Wommelgem (BE)

(73) Assignee: Dow Global Technologies LLC, Midland, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/081,279

(22) PCT Filed: Mar. 3, 2017

(86) PCT No.: PCT/US2017/020645
§ 371 (c)(1),
(2) Date: Aug. 30, 2018

(87) PCT Pub. No.: WO2017/152041
PCT Pub. Date: Sep. 8, 2017

(65) Prior Publication Data
US 2019/0078235 A1    Mar. 14, 2019

(30) Foreign Application Priority Data

Mar. 3, 2016   (EP) ..................... 16382094

(51) Int. Cl.
| | | |
|---|---|---|
| *D01F 6/04* | (2006.01) | |
| *E01C 13/08* | (2006.01) | |
| *D01F 6/30* | (2006.01) | |
| *D01F 6/46* | (2006.01) | |
| *C08F 210/16* | (2006.01) | |
| *C08J 5/18* | (2006.01) | |
| *C08L 23/08* | (2006.01) | |

(52) U.S. Cl.
CPC ............. *D01F 6/04* (2013.01); *D01F 6/30* (2013.01); *E01C 13/08* (2013.01); *C08F 210/16* (2013.01); *C08J 5/18* (2013.01); *C08L 23/0815* (2013.01); *D01F 6/46* (2013.01); *D10B 2321/021* (2013.01); *D10B 2505/202* (2013.01)

(58) Field of Classification Search
CPC ..... D01F 6/04; D01F 6/30; D01F 6/46; E01C 13/08; D10B 2505/202; D10B 2321/021; Y10T 428/23993; C08J 5/18; C08F 210/16; C08L 23/0815; D01D 5/08
See application file for complete search history.

(56) References Cited

U.S. PATENT DOCUMENTS

| | | |
|---|---|---|
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | LaPointe |
| 5,350,723 A | 9/1994 | Neithamer et al. |
| 5,425,872 A | 6/1995 | Devore et al. |
| 5,625,087 A | 4/1997 | Neithamer et al. |
| 5,721,185 A | 2/1998 | LaPointe et al. |
| 5,783,512 A | 7/1998 | Jacobsen et al. |
| 5,883,204 A | 3/1999 | Spencer et al. |
| 5,919,983 A | 7/1999 | Rosen et al. |
| 5,977,251 A | 11/1999 | Kao et al. |
| 6,515,155 B1 | 2/2003 | Klosin et al. |
| 6,696,379 B1 | 2/2004 | Carnahan et al. |
| 7,163,907 B1 | 1/2007 | Canich et al. |
| 8,372,931 B2 | 2/2013 | Hermel-Davidock et al. |
| 8,821,995 B2 | 9/2014 | Chai et al. |
| 8,829,115 B2 | 9/2014 | Hermel-Davidock et al. |
| 2013/0134088 A1* | 5/2013 | Dahringer ............. D04H 3/147 210/505 |
| 2013/0150537 A1* | 6/2013 | Hermel-Davidock ..... C08J 5/18 526/65 |
| 2013/0190465 A1 | 7/2013 | Demirors et al. |

(Continued)

FOREIGN PATENT DOCUMENTS

| | | |
|---|---|---|
| CN | 103038281 | 4/2013 |
| KR | 20000000048 U | 1/2000 |

(Continued)

OTHER PUBLICATIONS

International Search Report and Written Opinion pertaining to PCT/US2017/020645 dated Apr. 10, 2017.
Extended European Search Report pertaining to European Patent Application No. 16382094.7 dated Jun. 3, 2016.
Williams et al., "The Construction of a Polyethylene Calibration Curve for Gel Permeation Chromatography Using Polystyrene Fractions", J. Polym. Sci., Polym. Letters, 1968, 6, 621.
Monrabal et al, "Crystallization Elution Fractionation. A New Separation Process for Polyolefin Resins", Macromol. Symp., 2007, 257, 71-79.

(Continued)

*Primary Examiner* — Cheryl Juska
(74) *Attorney, Agent, or Firm* — Dinsmore & Shohl LLP

(57) ABSTRACT

The present disclosure provides a linear low density polyethylene composition, tapes, fibers and filaments, artificial turfs, and method of making the same. The linear low density polyethylene composition according to the present disclosure exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7.

16 Claims, 1 Drawing Sheet

(56) References Cited

U.S. PATENT DOCUMENTS

| | | | |
|---|---|---|---|
| 2014/0242304 A1 | 8/2014 | Sandkuehler et al. | |
| 2014/0316085 A1* | 10/2014 | Stewart | C08F 4/6592 |
| | | | 526/126 |
| 2014/0343229 A1* | 11/2014 | Weeks | C08L 23/10 |
| | | | 525/125 |
| 2015/0204027 A1* | 7/2015 | Bonavoglia | D06M 11/09 |
| | | | 428/17 |
| 2017/0081444 A1* | 3/2017 | Wang | B32B 5/02 |
| 2017/0152377 A1* | 6/2017 | Wang | B32B 27/306 |
| 2017/0226332 A1* | 8/2017 | Wang | C08L 23/0807 |
| 2018/0010304 A1* | 1/2018 | Bonavoglia | E01C 13/08 |
| 2019/0002676 A1* | 1/2019 | Miranda | C08J 5/18 |
| 2019/0062540 A1* | 2/2019 | Den Doelder | B32B 7/12 |
| 2019/0309487 A1* | 10/2019 | Bonavoglia | E01C 13/08 |
| 2020/0181853 A1* | 6/2020 | Lopez | D01F 6/46 |
| 2020/0255608 A1* | 8/2020 | Yee | B32B 5/022 |

FOREIGN PATENT DOCUMENTS

| | | | | |
|---|---|---|---|---|
| WO | WO-2011126886 A1 * | 10/2011 | | E01C 13/08 |
| WO | WO-2015200740 A2 * | 12/2015 | | C08F 210/16 |

OTHER PUBLICATIONS

Karjala et al., "Detection of low levels of long-chain branching in polyolefins", Annual Technical Conference—Society of Plastics Engineers (2008), 66th 887-891.

Office Action pertaining to Chinese Patent Application No. 201780015541.3, dated Oct. 23, 2020.

Office Action pertaining to Korean Patent Application No. 10-2018-7027163, dated Dec. 14, 2020.

* cited by examiner

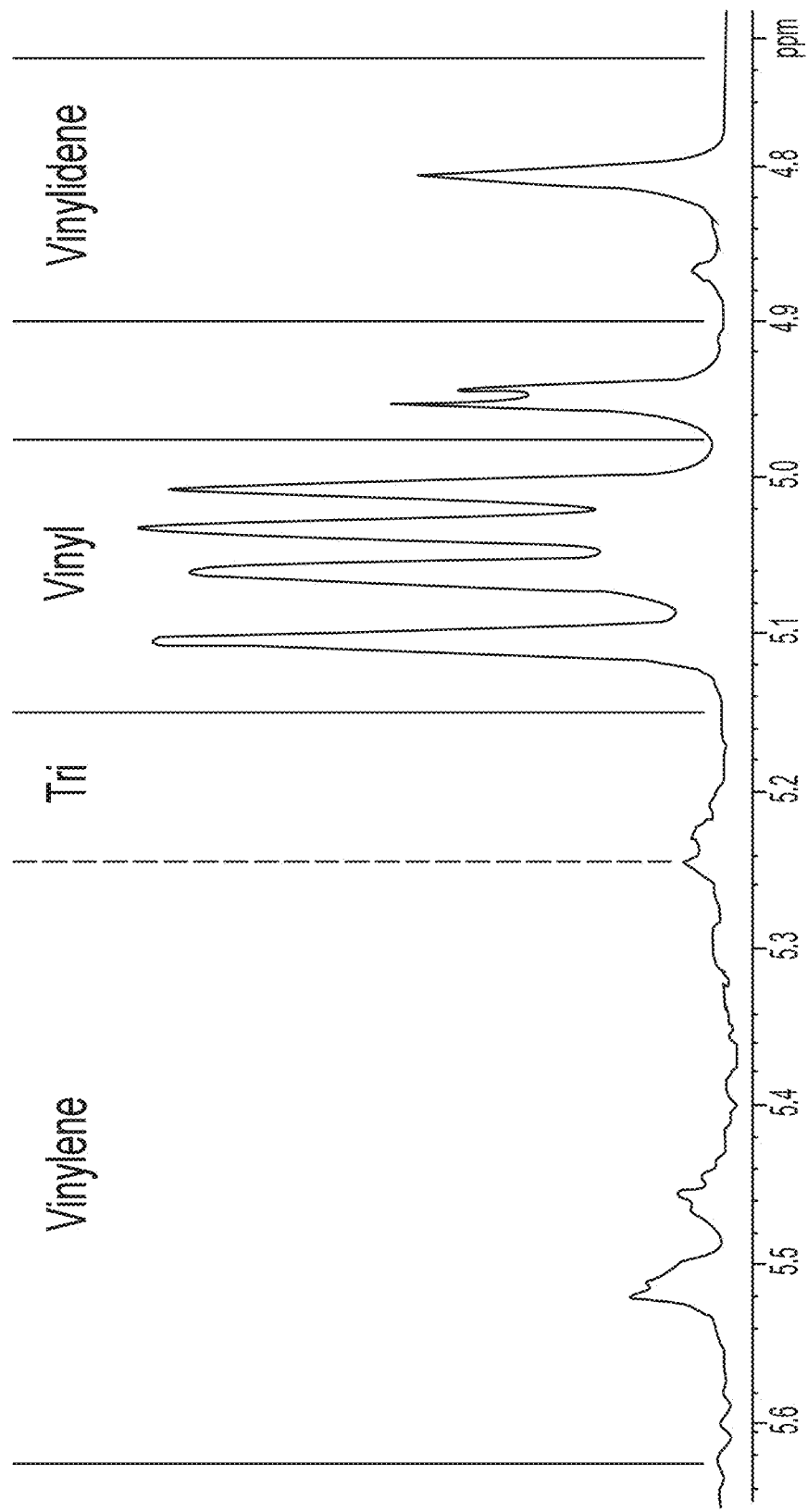

ARTIFICIAL TURFS AND METHOD OF MAKING THE SAME

FIELD OF INVENTION

The instant invention relates to artificial turf and method of making the same.

BACKGROUND OF THE INVENTION

The use of polyethylene compositions, such as linear low density polyethylenes in fabrication of artificial turf films is generally known. Any conventional method, such as gas phase process, slurry process, or solution process, may be employed to produce such polyethylene compositions. In addition, any conventional such as extrusion process may be employed to produce yarns for such artificial turfs.

Various polymerization techniques using different catalyst systems have been employed to produce such polyethylene compositions suitable for yarn productions for artificial turf applications. The typical process utilizes extrusion process to produce yarns for artificial turfs.

Despite the research efforts in developing linear low density polyethylene compositions suitable for yarn production for artificial turf applications, there is still a need for a linear low density polyethylene composition that allows to run at higher extrusion line speed during artificial turf yarn monofilament production, without compromising curl, shrinkage and mechanical performance.

SUMMARY OF THE INVENTION

The present disclosure provides a linear low density polyethylene composition, tapes, fibers and filaments, artificial turfs, and method of making the same.

In one embodiment, the present disclosure provides a linear low density polyethylene composition which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7.

In one embodiment, the present disclosure further provides an article of manufacture selected from the group consisting of tapes, fibers and filaments, wherein the article is produced from the linear low density polyethylene composition, as described herein.

In one embodiment, the present disclosure further provides artificial turf system comprising: (i) a primary backing having a top side and a bottom side; (ii) at least one artificial turf filament comprising a linear low density polyethylene composition, as described herein; (iii) wherein the at least one artificial turf filament is affixed to the primary backing such that the at least one artificial turf filament provides a tufted face extending outwardly from the top side of the primary backing.

In one embodiment, the present disclosure further provides a method of manufacturing an artificial turf filament, the method comprising: (a) providing a linear low density polyethylene composition which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7; and (b) extruding the linear low density polyethylene composition into an artificial turf filament.

In an alternative embodiment, the present disclosure further provides linear low density polyethylene compositions, tapes, fibers and filaments, artificial turfs, and method of making the same in accordance with any of the preceding embodiments, except that the method further comprises stretching the artificial turf filament to a predetermined stretch ratio.

In an alternative embodiment, the present disclosure further provides linear low density polyethylene compositions, tapes, fibers and filaments, artificial turfs, and method of making the same in accordance with any of the preceding embodiments, except that the linear low density polyethylene composition further exhibits a density (measured according to ASTM D792) from 0.915 and 0.925 g/cm$^3$.

In an alternative embodiment, the present disclosure further provides linear low density polyethylene compositions, tapes, fibers and filaments, artificial turfs, and method of making the same in accordance with any of the preceding embodiments, except that the polyethylene composition comprises units derived from ethylene and units derived from one or more comonomers selected from the group consisting of 1-butene, 1-hexene, and 1-octene.

In an alternative embodiment, the present disclosure further provides linear low density polyethylene compositions, tapes, fibers and filaments, artificial turfs, and method of making the same in accordance with any of the preceding embodiments, except that the polyethylene composition comprises no units derived from octene.

In an alternative embodiment, the present disclosure further provides linear low density polyethylene compositions, tapes, fibers and filaments, artificial turfs, and method of making the same in accordance with any of the preceding embodiments, except that the polyethylene composition is produced by a solution phase or gas phase polymerization process utilizing one or two reactors.

In an alternative embodiment, the present disclosure further provides linear low density polyethylene compositions, tapes, fibers and filaments, artificial turfs, and method of making the same in accordance with any of the preceding embodiments, except that the tapes, fibers and filaments exhibit a stretch ratio of equal to or greater than 4.

In an alternative embodiment, the present disclosure further provides linear low density polyethylene compositions, tapes, fibers and filaments, artificial turfs, and method of making the same in accordance with any of the preceding embodiments, except that the tapes, fibers and filaments exhibit a shrinkage of equal to or less than 5.5%.

In an alternative embodiment, the present disclosure further provides linear low density polyethylene compositions, tapes, fibers and filaments, artificial turfs, and method of making the same in accordance with any of the preceding embodiments, except that the tapes, fibers and filaments are stretched.

In an alternative embodiment, the present disclosure further provides linear low density polyethylene compositions, tapes, fibers and filaments, artificial turfs, and method of making the same in accordance with any of the preceding embodiments, except that the filaments is a monofilament.

BRIEF DESCRIPTION OF THE DRAWING

FIGURE is a graph depicting data from an $^1$H NMR double presaturation experiment.

DETAILED DESCRIPTION OF THE INVENTION

The present disclosure provides a linear low density polyethylene composition, tapes, fibers and filaments, artificial turfs, and method of making the same. The linear low density polyethylene composition according to the present disclosure exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7.

The article of manufacture according to the present disclosure can be selected from the group consisting of tapes, fibers and filaments, wherein the article is produced from the linear low density polyethylene composition, as described herein.

The artificial turf system according to the present disclosure comprises: (i) a primary backing having a top side and a bottom side; (ii) at least one artificial turf filament comprising a linear low density polyethylene composition, as described herein; (iii) wherein the at least one artificial turf filament is affixed to the primary backing such that the at least one artificial turf filament provides a tufted face extending outwardly from the top side of the primary backing.

In one embodiment, the present disclosure further provides a method of manufacturing an artificial turf filament, the method comprising: (a) providing a linear low density polyethylene composition which exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7; and (b) extruding the linear low density polyethylene composition into an artificial turf filament.

Linear Low Density Polyethylene

The linear low density polyethylene (LLDPE) exhibits each of the following properties: (1) a CEF fraction from 70 to 90° C. of equal to or greater than 80% of the total CEF fractions; (2) a melt index, $I_2$, measured according to ASTM D 1238 (2.16 kg @190° C.), in the range of equal to or greater than 2.0 g/10 min and equal to or less than 5.0 g/10 min; and (3) a melt flow ratio, $I_{10}/I_2$, of equal to or less than 6.7.

The linear low density polyethylene (LLDPE) comprises an ethylene/α-olefin copolymer comprising (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin copolymer" refers to a polymer that contains more than 50 mole percent polymerized ethylene monomer (based on the total amount of polymerizable monomers) and at least one other comonomer.

The α-olefin comonomers typically have no more than 20 carbon atoms. For example, the α-olefin comonomers may preferably have 3 to 8 carbon atoms, and more preferably 3 to 6 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, or in the alternative, from the group consisting of 1-butene and 1-hexene. In one embodiment, the linear low density polyethylene resin comprises no units derived from 1-octene.

The LLDPE has a melt index, $I_2$, measured according to ASTM D 1238 (2.16 kg @90° C.), in the range of equal to or greater than 2.0 g/10 min and equal to or less than 5.0 g/10 min. All individual values and subranges from 2.0 to 5.0 g/10 min are included and disclosed herein; for example, the $I_2$ may range from a lower limit of 2.0, 3.0 or 4.0 g/10 min to an upper limit of 3.0, 4.0 or 5.0 g/10 min. For example, the $I_2$ may be from 2.0 to 5.0 g/10 min, or in the alternative, 2.0 to 3.5 g/10 min, or in the alternative, 3.5 to 5.0 g/10 min, or in the alternative, 3.0 to 4.0 g/10 min.

The LLDPE is characterized by having a zero shear viscosity ratio (ZSVR) in the range of from 1.2 to 5.0. All individual values and subranges form 1.2 to 5.0 are included and disclosed herein; for example, the ZSVR can range from a lower limit of 1.2, 1.4, 1.6, 1.8 to an upper limit of 2.0, 3.0, 4.0 or 5.0. For example, the ZSVR may range from 1.2 to 5.0, or in the alternative, from 1.5 to 4, or in the alternative, from 1.8 to 3.5.

The LLDPE has a density in the range of 0.915 to 0.940 g/cm$^3$, for example from 0.915 to 0.925 g/cm$^3$. All individual values and subranges from 0.915 to 0.940 g/cm$^3$ are included and disclosed herein; for example, the density can range from a lower limit of 0.915, 0.920, 0.925, 0.930 or 0.935 g/cm$^3$ to an upper limit of 0.917, 0.922, 0.927, 0.932, 0.937 or 0.940 g/cm$^3$. For example, the density can be from 0.915 to 0.940 g/cm$^3$, or in the alternative, from 0.915 to 0.927 g/cm$^3$, or in the alternative, from 0.927 to 0.940 g/cm$^3$, or in the alternative, from 0.915 to 0.921 g/cm$^3$.

The LLDPE has a molecular weight distribution ($M_w/M_n$) in the range of from 2.0 to 3.5. All individual values and subranges from 2.0 to 3.5 are included and disclosed herein; for example, the molecular weight distribution ($M_w/M_n$) can range from a lower limit of 2, 2.1, 2.2, 2.4, 2.5, or 2.6 to an upper limit of 2.2, 2.3, 2.4, 2.5, 2.7, 2.9, 3.2, or 3.5. For example, the molecular weight distribution ($M_w/M_n$) can be from 2.0 to 3.5, or in the alternative, from 2.0 to 2.4, or in the alternative, from 2.0 to 2.8, or in the alternative, from 2.8 to 3.5.

The LLDPE has a molecular weight distribution ($M_z/M_n$) in the range of from 3.5 to 6. All individual values and subranges from 3.5 to 6 are included and disclosed herein; for example, the molecular weight distribution ($M_z/M_n$) can be from a lower limit of 3.5, 3.7, 3.9, 4.5 or 5 to an upper limit of 3.5, 4.0, 4.2, 4.4, 4.7, 5.0, 5.5 or 6.0. For example, the molecular weight distribution ($M_z/M_n$) can range from 3.5 to 6, or in the alternative, from 3.5 to 4.8, or in the alternative, from 4.8 to 6, or in the alternative, from 4 to 5, or in the alternative, from 3.5 to 4.5.

The LLDPE has a molecular weight distribution asymmetry $[(M_w/M_n)/(M_z/M_w)]$ i.e. $M_w^2/(M_n*M_z)$ in the range of from 1.00 to 1.40. For example, the molecular weight distribution asymmetry $M_w^2/(M_n*M_z)$ can be from a lower limit of 1.0, 1.05, 1.10, 1.15 or 1.20 to an upper limit of 1.25, 1.30, 1.35, or 1.40. For example, the molecular weight distribution asymmetry $M_w^2/(M_n*M_z)$ can range from 1.00 to 1.40, or in the alternative, from 1.00 to 1.20, or in the alternative, from 1.20 to 1.40, or in the alternative, from 1.10 to 1.30.

The LLDPE has a vinyl unsaturation of less than 150 vinyls per one million carbon atoms present in the backbone of the LLDPE. All individual values and subranges from less than 150 vinyls per one million carbon atoms are included and disclosed herein; for example, the vinyl unsaturation can be less than 150, or in the alternative, less than 120, or in the alternative, less than 80, or in the alternative, less than 50 vinyls per one million carbon atoms present in the backbone of the LLDPE.

The LLDPE has a heat of crystallization in the range of from 135 to 145 J/g. All individual values and subranges from 135 to 145 J/g are included and disclosed herein; for examples, the heat of crystallization can be from a lower limit of 135, 136, 137, or 138 J/g to an upper limit of 140, 141, 143, or 145 J/g. For example, the heat of crystallization can be in the range of from 135 to 145 J/g, or in the alternative, from 135 to 140 J/g, or in the alternative, from 140 to 145 J/g, or in the alternative, from 137 to 142 J/g.

The LLDPE has a peak crystallization temperature in the range of from 94 to 101° C. All individual values and subranges from 94 to 101° C. are included and disclosed herein; for examples, the peak crystallization temperature can be from a lower limit of 94, 95, 96, or 97° C. to an upper limit of 98, 99, 100, or 101° C. For example, the peak crystallization temperature can be from 94 to 101° C., or in the alternative, from 94 to 97° C., or in the alternative, from 97 to 101° C., or in the alternative, from 95 to 99° C.

The LLDPE has a heat of melting in the range of 135 to 145 J/g. All individual values and subranges from 135 to 145 J/g are included and disclosed herein; for examples, the heat of melting can be from a lower limit of 135, 136, 137, or 138 J/g to an upper limit of 140, 141, 143, or 145 J/g. For example, the heat of melting can be from 135 to 145 J/g, or in the alternative, from 135 to 140 J/g, or in the alternative, from 140 to 145 J/g, or in the alternative, from 137 to 142 J/g.

The LLDPE has a peak melting temperature in the range of 108 to 116° C. All individual values and subranges from 94 to 101° C. are included and disclosed herein; for examples, the peak melting temperature can be from a lower limit of 108, 109, 110, or 11° C. to an upper limit of 113, 114, 115, or 116° C. For example, the peak melting temperature can be from 108 to 116° C., or in the alternative, from 108 to 112° C., or in the alternative, from 112 to 116° C., or in the alternative, from 110 to 114° C.

In one embodiment, the LLDPE comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the LLDPE. The metal complex residues remaining from the catalyst system comprising a metal complex of a polyvalent aryloxyether in the LLDPE may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the LLDPE.

The LLDPE may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The LLDPE may contain from about 0.1 to about 10 percent by the combined weight of such additives, based on the weight of the LLDPE including such additives.

Any conventional ethylene (co)polymerization solution single reactor reaction processes may be employed to produce the LLDPE. One method of making the LLDPE disclosed herein is described in detail in U.S. Pat. No. 5,977,251, the disclosure of which is incorporated herein by reference in its entirety.

In one embodiment, the LLDPE is prepared via a polymerization process in a single solution phase loop reactor system, wherein the catalyst system comprises (a) one or more procatalysts comprising a metal-ligand complex of formula (I) below:

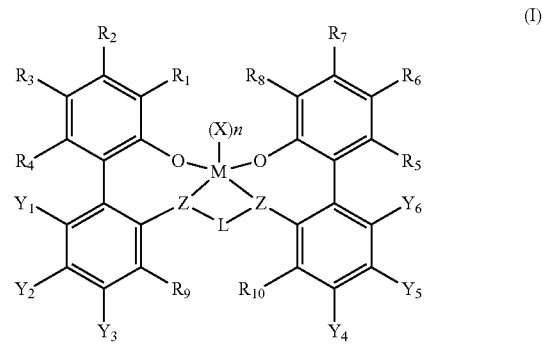

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, $N(C_1-C_{40})$hydrocarbyl, or $P(C_1-C_{40})$hydrocarbyl;

L is $(C_2-C_{40})$hydrocarbylene or $(C_2-C_{40})$heterohydrocarbylene, wherein the $(C_2-C_{40})$hydrocarbylene has a portion that comprises a 2-carbon atom to 10-carbon atom linker backbone linking the Z atoms in formula (I) (to which L is bonded) and the $(C_2-C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_2-C_{40})$heterohydrocarbylene independently is a carbon atom or heteroatom, wherein each heteroatom independently is O, S, S(O) S(O)$_2$, $Si(R^C)_2$, $Ge(R_C)_2$, $P(R^P)$, or $N(R^N$, wherein independently each $R^C$ is selected from the group consisting of $(C_1-C_{40})$hydrocarbyl. As used herein, the $R^C$ includes the situation wherein two $R^C$ groups are joined together to form a diradical ring in and wherein the Si is within the ring. Each $R^P$ is $(C_1-C_{40})$hydrocarbyl; and each $R^N$ is $(C_1-C_{40})$hydrocarbyl or absent; and $R_{1-10}$ are each independently selected from the group consisting of a $(C_1-C_{40})$hydrocarbyl, $(C_1-C_{40})$heterohydrocarbyl, $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C$=N—, $R^CC(O)$O—, $R^COC(O)$—, $R^CC(O)N(R)$—, $(R^C)_2NC(O)$—, halogen atom, hydrogen atom, and any combination thereof, and at least two of $Y_1$-$Y_3$ and at least two of $Y_4$-$Y_6$ are fluorine atoms and when only two of $Y_1$-$Y_3$ and only two of $Y_4$-$Y_6$ are fluorine atoms, the non-flourine $Y_1$-$Y_6$ are selected from the group consisting of H atom, alkyl groups, aryl groups, heteroaryl groups, and alkoxy groups, and optionally two or more R groups of the $R_{1-10}$ groups (for example, from $R_{1-4}$, $R_{5-8}$) can combine together into ring structures with such ring structures having from 2 to 50 atoms in the ring excluding any hydrogen atoms.

As used herein, the term "$(C_x$-$C_y)$hydrocarbyl" means a hydrocarbon radical of from x to y carbon atoms and the term "$(C_x$-$C_y)$hydrocarbylene" means a hydrocarbon diradical of from x to y carbon atoms and the term "$(C_x$-$C_y)$alkyl" means an alkyl group of from x to y carbon atoms and the term "$(C_x$-$C_y)$cycloalkyl" means a cycloalkyl group of from x to y carbon atoms.

As used herein, the term "$(C_1$-$C_{40})$hydrocarbyl" means a hydrocarbon radical of from 1 to 40 carbon atoms and the term "$(C_2$-$C_{40})$hydrocarbylene" means a hydrocarbon diradical of from 2 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a $(C_1$-$C_{40})$hydrocarbyl independently is an unsubstituted or substituted $(C_1$-$C_{40})$alkyl, $(C_3$-$C_{40})$cycloalkyl, $(C_3$-$C_{20})$cycloalkyl-$(C_1$-$C_{20})$alkylene, $(C_6$-$C_{40})$aryl, or $(C_6$-$C_{20})$aryl-$(C_1$-$C_{20})$alkylene. More preferably, each of the aforementioned $(C_1$-$C_{40})$hydrocarbyl groups independently has a maximum of 20 carbon atoms (i.e., $(C_1$-$C_{20})$hydrocarbyl), and still more preferably a maximum of 12 carbon atoms.

The terms "$(C_1$-$C_{40})$alkyl" and "$(C_1$-$C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1$-$C_{40})$alkyl are unsubstituted $(C_1$-$C_{20})$alkyl; unsubstituted $(C_1$-$C_{10})$alkyl; unsubstituted $(C_1$-$C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1$-$C_{40})$alkyl are substituted $(C_1$-$C_{20})$alkyl, substituted $(C_1$-$C_{10})$alkyl, trifluoromethyl, and $(C_{45})$alkyl. The $(C_{45})$alkyl is, for example, a $(C_{27}$-$C_{40})$alkyl substituted by one $R^S$, which is a $(C_{18}$-$C_5)$alkyl, respectively. Preferably, each $(C_1$-$C_5)$alkyl independently is methyl, trifluoromethyl, ethyl, 1-propyl, 1-methylethyl, or 1,1-dimethylethyl.

The term "$(C_6$-$C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6$-$C_{40})$aryl are unsubstituted $(C_6$-$C_{20})$aryl; unsubstituted $(C_6$-$C_{18})$aryl; 2-$(C_1$-$C_5)$alkyl-phenyl; 2,4-bis$(C_1$-$C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6$-$C_{40})$aryl are substituted $(C_6$-$C_{20})$aryl; substituted $(C_6$-$C_{18})$aryl; 2,4-bis[$(C_{20})$alkyl]-phenyl; polyfluorophenyl; pentafluorophenyl; and fluoren-9-one-1-yl.

The term "$(C_3$-$C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3$-$C_{12})$cycloalkyl)) are defined in an analogous manner. Examples of unsubstituted $(C_3$-$C_{40})$cycloalkyl are unsubstituted $(C_3$-$C_{20})$cycloalkyl, unsubstituted $(C_3$-$C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3$-$C_{40})$cycloalkyl are substituted $(C_3$-$C_{20})$cycloalkyl, substituted $(C_3$-$C_{10})$cycloalkyl, cyclopentanon-2-yl, and 1-fluorocyclohexyl.

Examples of $(C_1$-$C_{40})$hydrocarbylene are unsubstituted or substituted $(C_6$-$C_{40})$arylene, $(C_3$-$C_{40})$cycloalkylene, and $(C_1$-$C_{40})$alkylene (e.g., $(C_1$-$C_{20})$alkylene). In some embodiments, the diradicals are on a same carbon atom (e.g., —$CH_2$—) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha,omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of $(C_6$-$C_{18})$arylene, $(C_3$-$C_{20})$cycloalkylene, or $(C_2$-$C_{20})$alkylene.

The term "$(C_3$-$C_{40})$cycloalkylene" means a cyclic diradical (i.e., the radicals are on ring atoms) of from 3 to 40 carbon atoms that is unsubstituted or substituted by one or more $R^S$. Examples of unsubstituted $(C_3$-$C_{40})$cycloalkylene are 1,3-cyclopropylene, 1,1-cyclopropylene, and 1,2-cyclohexylene. Examples of substituted $(C_3$-$C_{40})$cycloalkylene are 2-oxo-1,3-cyclopropylene and 1,2-dimethyl-1,2-cyclohexylene.

The term "$(C_1$-$C_{40})$heterohydrocarbyl" means a heterohydrocarbon radical of from 1 to 40 carbon atoms and the term "$(C_1$-$C_{40})$heterohydrocarbylene" means a heterohydrocarbon diradical of from 1 to 40 carbon atoms, and each heterohydrocarbon independently has one or more heteroatoms O; S; S(O); $S(O)_2$; $Si(R^C)_2$; $Ge(R^C)_2$; $P(R^P)$; and $N(R^N)$, wherein independently each $R^C$ is unsubstituted $(C_1$-$C_{40})$hydrocarbyl, each $R^P$ is unsubstituted $(C_1$-$C_{40})$hydrocarbyl; and each $R^N$ is unsubstituted $(C_1$-$C_{40})$hydrocarbyl or absent (e.g., absent when N comprises —N= or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each $(C_1$-$C_{40})$heterohydrocarbyl and $(C_1$-$C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the $(C_1$-$C_{40})$heterohydrocarbyl independently is unsubstituted or substituted $(C_1$-$C_{40})$heteroalkyl, $(C_1$-$C_{40})$hydrocarbyl-O—, $(C_1$-$C_{40})$hydrocarbyl-S—, $(C_1$-$C_{40})$hydrocarbyl-S(O)—, $(C_1$-$C_{40})$hydrocarbyl-$S(O)_2$—, $(C_1$-$C_{40})$hydrocarbyl-$Si(R^C)_2$—, $(C_1$-$C_{40})$hydrocarbyl-$Ge(R^C)_2$—, $(C_1$-$C_{40})$hydrocarbyl-$N(R^N)$—, $(C_1$-$C_{40})$hydrocarbyl-P$(R^P)$—, $(C_2$-$C_{40})$heterocycloalkyl, $(C_2$-$C_{19})$heterocycloalkyl-$(C_1$-$C_{20})$alkylene, $(C_3$-$C_{20})$cycloalkyl-$(C_1$-$C_{19})$heteroalkylene, $(C_2$-$C_{19})$heterocycloalkyl-$(C_1$-$C_{20})$heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene. The term "($C_1$-$C_{40}$)heteroaryl" means an unsubstituted or substituted (by one or more $R^S$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., ($C_4$-$C_{12}$)heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

In some embodiments the ($C_1$-$C_{40}$)heteroaryl is 2,7-disubstituted carbazolyl or 3,6-disubstituted carbazolyl or unsubstituted carbazoles, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

The aforementioned heteroalkyl and heteroalkylene groups are saturated straight or branched chain radicals or diradicals, respectively, containing ($C_1$-$C_{40}$) carbon atoms, or fewer carbon atoms as the case may be, and one or more of the heteroatoms $Si(R^C)_2$, $Ge(R^C)_2$, $P(R^P)$, $N(R^N)$, N, O, S, S(O), and $S(O)_2$ as defined above, wherein each of the heteroalkyl and heteroalkylene groups independently are unsubstituted or substituted by one or more $R^S$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride ($F^-$), chloride ($Cl^-$), bromide ($Br^-$), or iodide ($I^-$) anion.

Unless otherwise indicated herein the term "heteroatom" means O, S, S(O), $S(O)_2$, $Si(R^C)_2$, $Ge(R^C)_2$, $P(R^P)$, or $N(R^N)$, wherein independently each $R^C$ is unsubstituted ($C_1$-$C_{40}$)hydrocarbyl, each $R^P$ is unsubstituted ($C_1$-$C_{40}$)hydrocarbyl; and each $R^N$ is unsubstituted ($C_1$-$C_{40}$)hydrocarbyl or absent (absent when N comprises —N=). Preferably, there are no O—O, S—S, or O—S bonds, other than O—S bonds in an S(O) or $S(O)_2$ diradical functional group, in the metal-ligand complex of formula (I). More preferably, there are no O—O, N—N, P—P, N—P, S—S, or O—S bonds, other than O—S bonds in an S(O) or $S(O)_2$ diradical functional group, in the metal-ligand complex of formula (I).

Preferably, there are no O—O, S—S, or O—S bonds, other than O—S bonds in an S(O) or $S(O)_2$ diradical functional group, in the metal-ligand complex of formula (I). More preferably, there are no O—O, N—N, P—P, N—P, S—S, or O—S bonds, other than O—S bonds in an S(O) or $S(O)_2$ diradical functional group, in the metal-ligand complex of formula (I).

The term "saturated" means lacking carbon-carbon double bonds, carbon-carbon triple bonds, and (in heteroatom-containing groups) carbon-nitrogen, carbon-phosphorous, and carbon-silicon double or triple bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds or triple bonds, not including any such double bonds that may be present in substituents $R^S$, if any, or in (hetero)aromatic rings, if any.

M is titanium, zirconium, or hafnium. In one embodiment, M is zirconium or hafnium, and in another embodiment M is hafnium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of formula (I) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, ($C_1$-$C_{40}$)hydrocarbyl carbanion, ($C_1$-$C_{40}$)heterohydrocarbyl carbanion, halide, nitrate, carbonate, phosphate, sulfate, $HC(O)O^-$, ($C_1$-$C_{40}$)hydrocarbyl$C(O)O^-$, $HC(O)N(H)^-$, ($C_1$-$C_{40}$)hydrocarbyl$C(O)N(H)^-$, ($C_1$-$C_{40}$)hydrocarbyl$C(O)N((C_1$-$C_{20})$hydrocarbyl$)^-$, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{40}$)heterohydrocarbylene and $R^M$ is as defined above.

Co-Catalyst Component

The procatalyst comprising the metal-ligand complex of formula (I) may be rendered catalytically active, in some embodiments, by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, (USPN) U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri($C_1$-$C_{10}$) alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$) hydrocarbyl) borate (e.g., trityl tetrafluoroborate) or a tri (($C_1$-$C_{20}$)hydrocarbyl)ammonium tetra(($C_1$-$C_{20}$)hydrocarbyl)borane (e.g., bis(octadecyl)methylammonium tetrakis (pentafluorophenyl)borane). As used herein, the term "ammonium" means a nitrogen cation that is a (($C_1$-$C_{20}$) hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound.

The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

End-Use Applications

Some embodiments of the present invention relate to methods of manufacturing an artificial turf filament. A method of manufacturing an artificial turf filament, in some embodiments, comprises providing any of the inventive compositions described herein, and extruding the inventive composition into an artificial turf filament. In some embodiments, such methods further comprise stretching the artificial turf filament to a predetermined stretch ratio. The stretch ratio, in some embodiments, is at least 4. Artificial turf filaments can be stretched using cold drawing techniques, hot drawing techniques, or combinations thereof.

Some embodiments of the present invention relate to artificial turf. Artificial turf, according to some embodiments of the present invention, comprises a primary backing having a top side and a bottom side, and at least one artificial turf filament formed from any of the inventive compositions described herein, wherein the at least one artificial turf filament is affixed to the primary backing such that the at least one artificial turf filament provides a tufted face extending outwardly from the top side of the primary backing. In some embodiments, the artificial turf further comprises a secondary backing bonded to at least a portion of the bottom side of the primary backing such that the at least one artificial turf filament is affixed in place to the bottom side of the primary backing.

Some embodiments of the present invention relate to methods of manufacturing an artificial turf. A method of manufacturing an artificial turf, in some embodiments, comprises providing at least one artificial turf filament formed from any of the inventive compositions described herein, and affixing the at least one artificial turf filament to a primary backing such that that at least one artificial turf filament provides a tufted face extending outwardly from a top side of the primary backing. In some embodiments, such methods further comprise bonding a secondary backing to at least a portion of the bottom side of the primary backing such that the at least one artificial turf filament is affixed in place to the bottom side of the primary backing.

Artificial Turf Filament

In some embodiments, the present invention relates to an artificial turf filament formed from any of the inventive compositions as described herein.

In some embodiments herein, the artificial turf filaments may exhibit a shrink of less than 6.0%. All individual values and subranges of less than 6.0% are included and disclosed herein. For example, in some embodiments, the artificial turf filaments may exhibit a shrink lower than 5.8, 5.5%, 5.3%, 5.2%, 5.0%, or lower. The shrink may be determined by submerging 1 meter of yarn in a heated oil bath at 90° C. for 20 seconds.

In yet other embodiments herein, the artificial turf filament may exhibit an elongation of at least 50%. The elongation is measured on a Zwick tensile tester on a filament length of 250 mm and extension rate of 250 mm/minute until the filament breaks. Elongation is the strain at break.

In particular embodiments herein, the artificial turf filaments may further include one or more additives. Nonlimiting examples of suitable additives include antioxidants, pigments, colorants, UV stabilizers, UV absorbers, curing agents, cross linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from less than about 0.01 wt % to more than about 10 wt % based on the weight of the composition.

The amount of the inventive composition to use in artificial turf filaments of the present invention can depend on a number of factors including, for example, the desired properties of the artificial turf filament, the desired properties of the artificial turf incorporating the filaments, the equipment available to manufacture the artificial turf filaments and/or the artificial turf, and others. An artificial turf filament of the present invention, in some embodiments, comprises at least 20 percent by weight of the inventive composition. In some embodiments, an artificial turf filament comprises 20 to 99 percent by weight of the inventive composition, or 20 to 94 percent by weight of the inventive composition, or 50 to 94 percent by weight of the inventive composition, or 80 to 94 percent by weight of the inventive composition, or 85 to 94 percent by weight of the inventive composition.

Artificial Turf Filament Process

The artificial turf filaments described herein may be made using any appropriate process for the production of artificial turf filament from polymer compositions as the artificial turf filaments described herein are process independent. Referring to FIG. 1, the following describes one such exemplary process 100 that may be used.

Artificial turf filaments may be made by extrusion. Suitable artificial turf filament extruders may be equipped with a single PE/PP general purpose screw and a melt pump ("gear pump" or "melt pump") to precisely control the consistency of polymer volume flow into the die. Artificial turf filament dies may have multiple single holes for the individual filaments distributed over a circular or rectangular spinplate. The shape of the holes corresponds to the desired filament cross-section profile, including for example, rectangular, dog-bone, v-shaped, and Mexican hat. A standard spinplate has 50 to 160 die holes of specific dimensions. Lines can have output rates from 150 kg/h to 350 kg/h.

The artificial turf filaments may be extruded into a water bath with a die-to-water bath distance of from 16 to 40 mm. Coated guiding bars in the water redirect the filaments towards the first takeoff set of rollers. The linear speed of this first takeoff set of rollers may vary from 15 to 70 m/min. The first takeoff set of rollers can be heated and used to preheat the filaments after the waterbath and before entering the stretching oven. The stretching oven may be a heated air or water bath oven. The filaments may be stretched in the stretching oven to a predetermined stretched ratio. In some embodiments, the stretch ratio is at least 4. In other embodiments, the stretch ratio is at least 4.5, 4.8, 5.0, 5.2, or 5.5. The stretching ratio is the ratio between the speed of the second takeoff set of rollers after the stretching oven and the speed of the first takeoff set of rollers before the stretching oven. The second takeoff set of rollers may be run at a different (higher or lower) speed than the first set of rollers.

After the filaments are passed over the second takeoff set of rollers, they are then drawn through a set of three annealing ovens. The three annealing ovens may be either a hot air oven with co- or countercurrent hot air flow, which can be operated from 50 to 150° C. or a hot water-oven, wherein the filaments are oriented at temperatures from 50 to 98° C. At the exit of the first annealing oven, the filaments are passed onto a third set of rollers that may be run at a different (higher or lower) speed than the second set of rollers. The linear velocity ratio of the third set of rollers located after the oven to the second set of rollers located in front of the oven may be referred to as either a stretching or relaxation ratio. At the exit of the second annealing oven, the filaments are passed onto a fourth set of rollers that may be run at a different (higher or lower) speed than the third set of rollers. At the exit of the third annealing oven, the filaments are passed onto a fifth set of rollers that may be run at a different (higher or lower) speed than the fourth set of rollers.

In some embodiments, a method of manufacturing an artificial turf filament comprises providing any of the inventive compositions previously described herein, and extruding the inventive composition into an artificial turf filament. The artificial turf filament may be extruded to a specified width, thickness, and/or cross-sectional shape depending on the physical dimensions of the extruder. As mentioned above, the artificial turf filament can include a monofilament, a multifilament, a film, a fiber, a yarn, such as, for example, tape yarn, fibrillated tape yarn, or slit-film yarn, a continuous ribbon, and/or other fibrous materials used to form synthetic grass blades or strands of an artificial turf field.

The artificial turf filament may optionally undergo further post-extrusion processing (e.g., annealing, cutting, etc.).

Artificial Turf

One or more embodiments of the artificial turf filaments described herein may be used to form an artificial turf field. The artificial turf field comprises a primary backing having a top side and a bottom side; and at least one artificial turf filament as previously described herein. The at least one artificial turf filament is affixed to the primary backing such that the at least one artificial turf filament provides a tufted face extending outwardly from the top side of the primary backing. As used herein, "affix," "affixed," or "affixing" includes, but is not limited to, coupling, attaching, connecting, fastening, joining, linking or securing one object to another object through a direct or indirect relationship. The tufted face extends from the top side of the primary backing, and can have a cut pile design, where the artificial turf filament loops may be cut, either during tufting or after, to produce a pile of single artificial turf filament ends instead of loops.

The primary backing can include, but is not limited to, woven, knitted, or non-woven fibrous webs or fabrics made of one or more natural or synthetic fibers or yarns, such as polypropylene, polyethylene, polyamides, polyesters, and rayon. The artificial turf field may further comprise a secondary backing bonded to at least a portion of the bottom side of the primary backing such that the at least one artificial turf filament is affixed in place to the bottom side of the primary backing. The secondary backing 230 may comprise polyurethane (including, for example, polyurethane supplied under the name ENFORCER™ or ENHANCER™ available from The Dow Chemical Company) or latex-based materials, such as, styrene-butadiene latex, or acrylates.

The primary backing and/or secondary backing may have apertures through which moisture can pass. The apertures may be generally annular in configuration and are spread throughout the primary backing and/or secondary backing. Of course, it should be understood that there may be any number of apertures, and the size, shape and location of the apertures may vary depending on the desired features of the artificial turf field.

The artificial turf field may be manufactured by providing at least one artificial turf filament as described herein and affixing the at least one artificial turf filament to a primary backing such that that at least one artificial turf filament provides a tufted face extending outwardly from a top side of the primary backing. The artificial turf field may further be manufactured by bonding a secondary backing to at least a portion of the bottom side of the primary backing such that the at least one artificial turf filament is affixed in place to the bottom side of the primary backing.

The artificial turf field may optionally comprise a shock absorption layer underneath the secondary backing of the artificial turf field. The shock absorption layer can be made from polyurethane, PVC foam plastic or polyurethane foam plastic, a rubber, a closed-cell crosslinked polyethylene foam, a polyurethane underpad having voids, elastomer foams of polyvinyl chloride, polyethylene, polyurethane, and polypropylene. Non-limiting examples of a shock absorption layer are DOW® ENFORCER™ Sport Polyurethane Systems, and DOW® ENHANCER™ Sport Polyurethane Systems.

The artificial turf field may optionally comprise an infill material. Suitable infill materials include, but are not limited to, mixtures of granulated rubber particles like SBR (styrene butadiene rubber) recycled from car tires, EPDM (ethylene-propylene-diene monomer), other vulcanised rubbers or rubber recycled from belts, thermoplastic elastomers (TPEs) and thermoplastic vulcanizates (TPVs).

The artificial turf field may optionally comprise a drainage system. The drainage system allows water to be removed from the artificial turf field and prevents the field from becoming saturated with water. Nonlimiting examples of drainage systems include stone-based drainage systems, EXCELDRAIN™ Sheet 100, EXCELDRAIN™ Sheet 200, AND EXCELDRAIN™ EX-T STRIP (available from American Wick Drain Corp., Monroe, N.C.).

EXAMPLES

The following examples illustrate the present invention but are not intended to limit the scope of the invention. The examples of the instant invention demonstrate that selection of LLDPE of the present disclosure leads to a combination of low relaxation time, evident from high $I_2$ and low $I_{10}/I_2$, and narrow chemical composition distribution (short-chain branching distribution), evident from a very narrow CEF distribution.

Comparative composition 1 is EXCEED 3518 is an ethylene-hexene copolymer prepared via gas phase polymerization process in the presence of a metallocene catalyst system having a melt index ($I_2$) of approximately 3.5 g/10 minutes, a CEF fraction from 70 to 90° C. of 74.5%, an $I_{10}/I_2$ of 5.8, and a density of approximately 0.918 g/cm³, available from ExxonMobil Chemical Company.

Comparative composition 2 is DOWLEX 2107G is a heterogeneously branched ethylene-octene copolymer having a melt index ($I_2$) of approximately 2.3 g/10 minutes, a CEF fraction from 70 to 90° C. of 48.6%, an $I_{10}/I_2$ of 8.5 and a density of approximately 0.917 g/cm³, available from The Dow Chemical Company.

Inventive composition 1 is an ethylene-hexene copolymer prepared via solution polymerization process in the presence of a catalyst system comprising a metal complex of a polyvalent aryloxyether having a melt index ($I_2$) of approximately 3.2 g/10 minutes, a CEF fraction from 70 to 90° C. of 91.9%, an $I_{10}/I_2$ of 6.5, and a density of approximately 0.918 g/cm³.

Inventive composition 1 is prepared via solution polymerization in a single loop reactor system as described in U.S. Pat. No. 5,977,251 in the presence of a catalyst system comprising a procatalyst represented by the following formula:

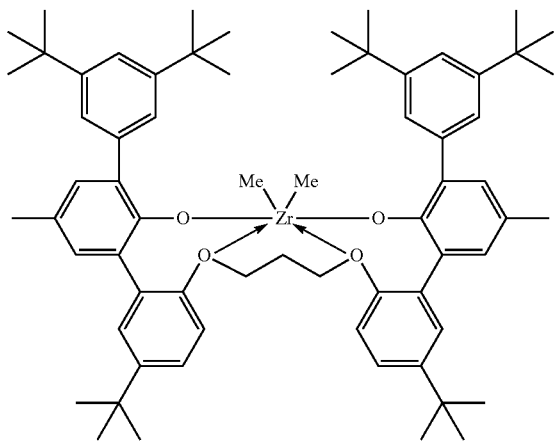

The polymerization conditions for inventive composition 1 is reported in Tables 1 and 2. Referring to Tables 1 and 2, TEA is triethyl aluminum. Properties of Inventive Composition 1 and Comparative Compositions 1 and 2 were measured and reported in Tables 3-6.

Comparative composition 1 is EXCEED 3518 is an ethylene-hexene copolymer prepared via gas phase polymerization process in the presence of a metallocene catalyst system having a melt index ($I_2$) of 3.5 g/10 minutes, a CEF fraction from 70 to 90° C. of 74.5%, an $I_{10}/I_2$ of 5.8, and a density of 0.918 g/cm$^3$, available from ExxonMobil Chemical Company.

Comparative composition 2 is DOWLEX 2107G is a heterogeneously branched ethylene-octene copolymer having a melt index ($I_2$) of approximately 2.3 g/10 minutes, a CEF fraction from 70 to 90° C. of 48.6%, an $I_{10}/I_2$ of 8.5 and a density of 0.917 g/cm$^3$, available from The Dow Chemical Company.

Inventive composition 1 is an ethylene-hexene copolymer having a melt index ($I_2$) of 3.2 g/10 minutes, a CEF fraction from 70 to 90° C. of 91.9%, an $I_{10}/I_2$ of 6.5, and a density of 0.918 g/cm$^3$. Inventive composition 1 is prepared via solution polymerization in a single loop reactor system in the presence of a catalyst system comprising a procatalyst represented by the following formula:

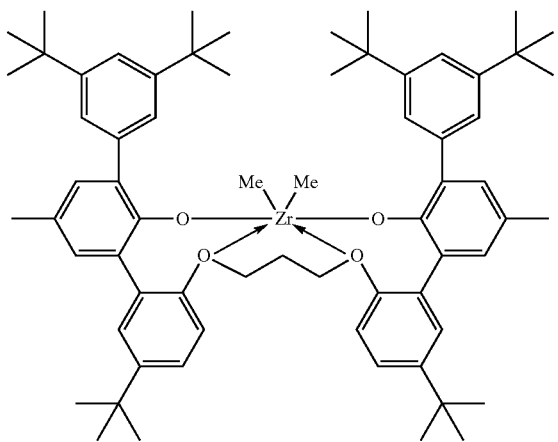

The polymerization conditions for Inventive composition 1 are reported in Tables 1 and 2. Referring to Tables 1 and 2, TEA is triethylaluminum and PETROSOL D 100/120 is solvent which is commercially available from CEPSA (Compañia Española de Petróleos, S.A.U., Madrid, Spain). Properties of Inventive Composition 1 and Comparative Compositions 1 and 2 are measured and reported in Tables 3-6.

TABLE 1

| 1. REACTOR FEEDS | Units | Inventive Composition 1 |
|---|---|---|
| Reactor Solvent/Ethylene Feed Flow ratio | g/g | 4.05 |
| Solvent Type Used | | PETROSOL D 100/120 |
| Comonomer Type Used | | 1-Hexene |
| Reactor Comonomer/Ethylene Feed Flow ratio | g/g | 0.257 |
| Reactor Fresh Hydrogen/ethylene Feed Flow ratio | g/kg | 0.111 |
| Reactor Control Temperature | ° C. | 155 |
| Reactor Pressure (gauge) | bar | 51.7 |
| Reactor Ethylene Conversion | % | 86.5 |
| Reactor Residence Time | min | 6.7 |
| Recycle Ratio | | 4.3 |

TABLE 2

| 3. CATALYST | Inventive Composition 1 |
|---|---|
| Reactor Co-Catalyst-1/Catalyst Molar feed Ratio | 3.0 |

TABLE 2-continued

| 3. CATALYST | Inventive Composition 1 |
|---|---|
| Reactor Co-Catalyst-1 Type | bis(hydrogenated tallow alkyl)methyl, tetrakis(pentafluorophenyl)borate(1-) amine |
| Reactor Co-Catalyst-2/Catalyst Molar Ratio | 33 |
| Reactor Co-Catalyst-2 Type | TEA |

TABLE 3

| | Unsaturation unit/1,000,000 carbon | | | | |
|---|---|---|---|---|---|
| | vinylene | Trisubstituted | vinyl | vinylidene | Total |
| Inventive Composition 1 | 3 | Not Determined (ND) | 35 | 2 | 40 |
| Comparative Composition 1 | 14 | 41 | 51 | 20 | 126 |
| Comparative Composition 2 | 45 | 18 | 305 | 67 | 435 |

TABLE 4

| | $M_w$ (g/mol) | ZSV (Pas) | ZSVR |
|---|---|---|---|
| Inventive Composition 1 | 75000 | 2820 | 1.98 |
| Comparative Composition 1 | 77100 | 2050 | 1.30 |
| Comparative Composition 2 | 87100 | 4190 | 1.70 |

TABLE 5

| | $M_n$ (g/mol) | $M_w$ (g/mol) | $M_z$ (g/mol) | $M_w/M_n$ | $M_z/M_w$ |
|---|---|---|---|---|---|
| Inventive Composition 1 | 34300 | 75000 | 136000 | 2.19 | 1.81 |
| Comparative Composition 1 | 31000 | 77100 | 137000 | 2.49 | 1.77 |
| Comparative Composition 2 | 21600 | 87100 | 327000 | 4.03 | 3.75 |

TABLE 6

| | Heat of crystallization (g/mol) | Peak crystallization temperature (° C.) | Heat of melting (g/mol) | Peak melting temperature (° C.) |
|---|---|---|---|---|
| Inventive Composition 1 | 139.7 | 97.1 | 139.7 | 112.3 |
| Comparative Composition 1 | 145.6 | 101.1 | 145.1 | 113.8 |
| Comparative Composition 2 | 140.7 | 107.1 | 140.3 | 123.3 |

Each of Inventive Composition 1 and Comparative Compositions 1 and 2 are formed into filaments. Inventive Filaments 1-4 are produced from Inventive Composition 1. The Inventive Filaments differ based upon the process conditions used to produce the filaments, as set forth in Tables 7-9. Comparative Filaments 1 and 6 are produced from EXCEED 3518. Comparative Filaments 2-5 are produced from DOWLEX 2107G. All exemplary filaments are monofilaments.

The additives were blended with the polymer compositions prior to extrusion. Each of the monofilaments was prepared on an extrusion line from Oerlikon Barmag (Remscheid, Germany) with the following conditions:

Die type—Mexican Hat (total 48 holes)

Extruder Temperature—230° C.

Distance die to water bath—40 m

Temperature water bath—35° C.

Temperature stretching oven—97° C.

Oven 1 temperature—118° C.

Oven 2 temperature—118° C.

The Inventive and Comparative monofilaments were tested for tenacity, elongation, shrinkage and curl. Tenacity and elongation were measured on a Zwick tensile tester on a filament length of 250 mm and extension rate of 250 mm/min until the filament breaks. Tenacity is defined as the tensile force at break divided by the linear weight (dtex). Elongation is the strain at break. Tables 7-9 provide the testing results for the Inventive and Comparative Filaments.

Basis Weight

The basis weight of filaments is typically reported in the industry by the dTex value. The dTex of a monofilament is equal to the weight in grams of 10 km of the monofilament. The target basis weight for all Filaments was 2000 dTex.

TABLE 7

|  | Inventive Filament 1 | Comparative Filament 1 | Comparative Filament 2 |
|---|---|---|---|
| Tenacity (cN/dtex) | 1.07 | 1.06 | 0.88 |
| Elongation (%) | 72.3 | 77.9 | 53.6 |
| shrink (%) | 4.1 | 4.9 | 7.2 |
| Curl | 1.0 | 1.0 | 1.5 |
| Relaxation, step 2 | 0.75 | 0.75 | 0.75 |
| Temperature of oven 3 | 115 | 115 | 115 |
| Speed (m/min) | 140 | 140 | 140 |

TABLE 8

|  | Inventive Filament 2 | Inventive Filament 3 | Inventive Filament 4 |
|---|---|---|---|
| Tenacity (cN/dtex) | 1.03 | 0.98 | 1.00 |
| Elongation (%) | 55.4 | 53.9 | 58.4 |
| shrink (%) | 4.5 | 5.8 | 5.0 |
| Curl | 1.5 | 2.5 | 2.0 |
| Relaxation, step 2 | 0.95 | 0.95 | 0.91 |
| Temperature of oven 3 | 115 | 115 | 118 |
| Speed (m/min) | 180 | 200 | 200 |

TABLE 9

|  | Comparative Filament 3 | Comparative Filament 4 | Comparative Filament 5 | Comparative Filament 6 |
|---|---|---|---|---|
| Tenacity (cN/dtex) | 0.95 | 0.91 | 0.83 | 0.97 |
| Elongation (%) | 46.5 | 40.6 | 45..2 | 59.5 |
| shrink (%) | 7.7 | 8.8 | 6.9 | 6.3 |
| Curl | 2.0 | 2.0 | 2.0 | 3.5 |
| Relaxation, step 2 | 0.95 | 0.95 | 0.91 | 0.91 |
| Temperature of oven 3 | 115 | 115 | 118 | 115 |
| Speed (m/min) | 180 | 200 | 200 | 180 |

Test Methods

Test methods include the following:

Melt Index

Melt indices ($I_2$ and $I_{10}$) were measured in accordance to ASTM D-1238 at 190° C. and at 2.16 kg and 10 kg load, respectively. Their values are reported in g/10 min.

Density

Samples for density measurement were prepared according to ASTM D4703. Measurements were made within one hour of sample pressing using ASTM D792, Method B.

High Temperature Gel Permeation Chromatography

The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci.*, Polym. Letters, 6, 621 (1968)):

$$M_{polyethylene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

DSC Crystallinity

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175.degree. C.; the melted sample is then air-cooled to room temperature (about 25° C.). A 3-10 mg, 6 mm diameter specimen is extracted from the cooled polymer, weighed, placed in a light aluminum pan (about 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak recrystallization temperature ($T_p$), heat of fusion ($H_f$) (in Joules per gram), and the calculated % crystallinity for polyethylene samples using the following equation:

% Crystallinity=(($H_f$)/(292 J/g))×100.

The heat of fusion ($H_f$) and the peak melting temperature are reported from the second heat Crystallization Elution Fractionation (CEF) Method The Crystallization Elution Fractionation (CEF) method is conducted according to the method described in Monrabal et al, Macromol. Symp. 257, 71-79 (2007), which is incorporated herein by reference. The CEF instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50 mm×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is hereinafter referred to as "ODCB-m." ODCB-m is sparged with dried nitrogen ($N_2$) for one hour before use. Dried nitrogen is obtained by passing nitrogen at <90 psig over $CaCO_3$ and 5 Å molecular sieves. A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 25° C., thermal equilibrium at 30° C. for 5 minutes (including Soluble Fraction Elution Time being set as 2 minutes), and elution at 3° C./min from 25° C. to 140° C. The flow rate during crystallization is 0.052 mL/min. The flow rate during elution is 0.50 mL/min. The IR-4 signal data is collected at one data point/second.

The CEF column is packed with glass beads at 125 μm±6% (such as those commercially available from MO-SCI Specialty Products) with ⅛ inch stainless tubing according to U.S. 2011/0015346 A1. The internal liquid volume of the CEF column is between 2.1 mL and 2.3 mL. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 25.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

The CEF fraction from 70 to 90° C., is defined as the integral of the IR-4 chromatogram (baseline subtracted measurement channel) in the elution temperature ranging from 70.0 to 90.0° C. divided by the total integral from 25 to 140.0° C. according to the follow equation:

$$CEF \text{ fraction from 70 to 90° C.} = \frac{\int_{70}^{90} IRdT}{\int_{25}^{140} IRdT} \times 100\%$$

where T is the elution temperature (from the calibration discussed above).

A linear baseline is calculated by selecting two data points: one before the polymer elutes, usually at a temperature of 25.5° C., and another one after the polymer elutes, usually at 118° C. For each data point, the detector signal is subtracted from the baseline before integration.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-$d_2$ (TCE) and perchloroethylene (50:50, w:w) with 0.001M $Cr^{3+}$. The solution in the tube is purged with N2 for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as following:

$$NCH_2 = I_{total}/2$$

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations ($I_{vinylene}$, $I_{trisubstituted}$, $I_{vinyl}$ and $I_{vinylidene}$) were integrated based on the region shown in the FIGURE.

The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000C = (N_{vinylene}/NCH_2)*1,000,000$$

$$N_{trisubstituted}/1,000,000C = (N_{trisubstituted}/NCH_2)*1,000,000$$

$$N_{vinyl}/1,000,000C = (N_{vinyl}/NCH_2)*1,000,000$$

$$N_{vinylidene}/1,000,000C = (N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown below:

```
;lc1prf2_zz
prosol relations=<lcnmr>
#include <Avance,Incl>
"d12=20u"
d11=tu"
1 ze
d12 p121:f1
2 30m
d13
d12 pl9:f1
d1 cw:f1 ph29 cw:f2 ph29
d11 do:f1 do:f2
d12 p11:f1
p1 ph1
go=2 ph31
30m mc #0 to 2 f0(zd)
exit
ph 1=0 2 2 0 1 3 3 1
ph 29=0
ph 31=0 2 2 0 1 3 3 1
```

Shrinkage is measured submerging 100 cm of yarn (wrapped in approximately 10 cm diameter coil) for 20 seconds in a hot oil bath (90° C.). Yarn was removed from the bath, dried manually, and re-measured for length. The amount was subtracted from 100 cm to determine shrinkage.

Curl measured by taking a bundle of 20 filaments and leaving it for 10 minutes in an oven at 90° C.

Curl is measured by taking a bundle of 20 filaments and leaving it for 10 minutes in an oven at 90° C. The classification is made visually by ranking the samples based on a catalogue of standard samples. The method looks at how much the originally straight filaments tend to bend and curl on the sides.

Shrink %

The shrink of a monofilament (expressed as the percentage reduction in length of a 1 meter sample of the monofilament) is measured by immersing the monofilament for 20 seconds in a bath of silicon oil maintained at 90° C. Shrinkage is then calculated as: (length before−length after)/length before*100%.

Curl

Curl is measured by taking a bundle of 20 filaments and leaving it for 10 minutes in an oven at 90° C. The classification is made visually by ranking the samples based on a catalogue of standard samples. The method looks at how much the originally straight filaments tend to bend and curl on the sides. The samples are ranked between 1-5, with 1 representing filaments that showed no or very minor bending and curling and 5 representing filaments showing strong bending and curling.

The present invention may be embodied in other forms without departing from the spirit and the essential attributes thereof, and, accordingly, reference should be made to the appended claims, rather than to the foregoing specification, as indicating the scope of the invention.

We claim:

1. A linear low density polyethylene composition comprising:
    (1) a Crystallization Elution Fractionation (CEF) fraction from 70 to 90° C. of equal to or greater than 80% of the total CEF fractions;
    (2) a melt index, $I_2$, measured according to ASTM D 1238 (2.16 kg @190° C.), in the range of equal to or greater than 2.0 g/10 min and equal to or less than 5.0 g/10 min; and
    (3) a melt flow ratio, $I_{10}/I_2$, of equal to or less than 6.7.

2. The linear low density polyethylene composition of claim 1, further comprising a density (measured according to ASTM D792) from 0.915 and 0.925 g/cm$^3$.

3. The linear low density polyethylene composition of claim 1, wherein the polyethylene composition comprises units derived from ethylene and units derived from one or more comonomers selected from the group consisting of butane, hexane, and octene.

4. The linear low density polyethylene composition of claim 1, wherein the polyethylene composition comprises no units derived from octene.

5. The linear low density polyethylene composition of claim 1, wherein the polyethylene composition is produced by a solution phase or gas phase polymerization process utilizing one or two reactors.

6. An article of manufacture selected from the group consisting of tapes, fibers and filaments, wherein the article is produced from a linear low density polyethylene composition, and wherein the linear low density polyethylene composition comprises;
    (1) a Crystallization Elution Fractionation (CEF) fraction from 70 to 90° C. of equal to or greater than 80% of the total CEF fractions;
    (2) a melt index, $I_2$, measured according to ASTM D 1238 (2.16 kg @190° C.), in the range of equal to or greater than 2.0 g/10 min and equal to or less than 5.0 g/10 min; and
    (3) a melt flow ratio, $I_{10}/I_2$, of equal to or less than 6.7.

7. The article of manufacture of claim 6 which exhibits a stretch ratio of equal to or greater than 4.

8. The article of manufacture of claim 6, wherein the article exhibits a shrinkage of equal to or less than 5.5%.

9. The article of manufacture of claim 6, wherein the article is a stretched tape.

10. The article of manufacture of claim 6, wherein the article is a monofilament.

11. The article of manufacture of claim 6, wherein the article is a fiber.

12. An artificial turf system comprising one or more articles of manufacture according to claim 6.

13. An artificial turf system comprising:
    a primary backing having a top side and a bottom side; and
    at least one artificial turf filament according to claim 10;
    wherein the at least one artificial turf filament is affixed to the primary backing such that the at least one artificial turf filament provides a tufted face extending outwardly from the top side of the primary backing.

14. A method of manufacturing an artificial turf filament, the method comprising:
    extruding a linear low density polyethylene composition into an artificial turf filament,
    wherein the linear low density polyethylene composition comprises:
    (1) a Crystallization Elution Fractionation (CEF) fraction from 70 to 90° C. of equal to or greater than 80% of the total CEF fractions;
    (2) a melt index, $I_2$, measured according to ASTM D 1238 (2.16 kg @190° C.), in the range of equal to or greater than 2.0 g/10 min and equal to or less than 5.0 g/10 min; and
    (3) a melt flow ratio, $I_{10}/I_2$, of equal to or less than 6.7.

15. The method according to claim 14, wherein the method further comprises stretching the artificial turf filament to a predetermined stretch ratio.

16. The method of claim 15, wherein the stretch ratio is at least 4.

* * * * *